US012365071B2

(12) United States Patent
Wang

(10) Patent No.: US 12,365,071 B2
(45) Date of Patent: Jul. 22, 2025

(54) HYBRID NAIL GUN

(71) Applicants: HANGZHOU UNITED TOOLS CO., LTD., Hangzhou (CN); HANGZHOU GREAT STAR INDUSTRIAL CO., LTD., Hangzhou (CN)

(72) Inventor: Weiyi Wang, Hangzhou (CN)

(73) Assignees: Hangzhou United Tools Co., Ltd., Hangzhou (CN); Hangzhou Great Star Industrial Co., Ltd., Hangzhou (CN)

( * ) Notice: Subject to any disclaimer, the term of this patent is extended or adjusted under 35 U.S.C. 154(b) by 71 days.

(21) Appl. No.: 18/159,826

(22) Filed: Jan. 26, 2023

(65) Prior Publication Data

US 2023/0234200 A1 Jul. 27, 2023

Related U.S. Application Data

(63) Continuation-in-part of application No. PCT/CN2020/104764, filed on Jul. 27, 2020.

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
CPC ................................. B25C 1/06; B25C 1/047
USPC ......................................................... 227/130
See application file for complete search history.

(56) References Cited

U.S. PATENT DOCUMENTS 7,311,027 B1 12/2007 Tatsuno
2007/0059186 A1* 3/2007 Weaver .................. F04B 41/02 417/234
2010/0200260 A1* 8/2010 Mikami .................... B25C 1/04 173/217
2019/0202042 A1 7/2019 Wu et al.
2020/0189081 A1 6/2020 Yang (Continued)

FOREIGN PATENT DOCUMENTS

CN 2001088046 A 4/2001
CN 2767071 Y 3/2006

(Continued)

OTHER PUBLICATIONS

WIPO; International Search Report and Written Opinion from International Application PCT/CN2020/104764, mailed Jan. 27, 2021 (14 pages).

*Primary Examiner* — Thanh K Truong
*Assistant Examiner* — Xavier A Madison
(74) *Attorney, Agent, or Firm* — Fitch, Even, Tabin & Flannery LLP

(57) ABSTRACT

The present invention discloses a hybrid nail gun, which comprises a power component and a drive component, wherein the power component is driven by the drive component, and the drive component comprises at least a gas driven device and an electric driven device. The present invention may be used as a pneumatic nail gun when it can be connected to a gas source. The present invention may use a power source to drive the power component to complete a nailing action when it is impossible or inconvenient to connect a gas source. The present invention can flexibly adapt to different work scenarios without the need to change different types of nail guns. Therefore, the work efficiency is improved and the cost is reduced.

13 Claims, 10 Drawing Sheets

(56) References Cited

U.S. PATENT DOCUMENTS

| | | | |
|---|---|---|---|
| 2020/0215672 | A1 | 7/2020 | Pomeroy |
| 2021/0237240 | A1 | 8/2021 | Feng et al. |

FOREIGN PATENT DOCUMENTS

| | | | |
|---|---|---|---|
| CN | 101516575 | A | 8/2009 |
| CN | 202106356 | U | 1/2012 |
| CN | 105818099 | A | 8/2016 |
| CN | 205835215 | U | 12/2016 |
| CN | 209754092 | U | 12/2019 |
| CN | 210819410 | U | 6/2020 |
| WO | 2019109892 | A1 | 6/2019 |
| WO | 2020112867 | A1 | 6/2020 |
| WO | 2022020987 | A1 | 2/2022 |

* cited by examiner

HYBRID NAIL GUN

CROSS-REFERENCE TO RELATED APPLICATION

The present application is a continuation-in-part of International Application No. PCT/CN2020/104764, filed on Jul. 27, 2020, the disclosure of which is incorporated herein in its entirety by reference.

FIELD OF THE INVENTION

The present invention relates to a power tool, and in particular to a hybrid nail gun.

DESCRIPTION OF THE PRIOR ART

A nail gun is a product of the modern nail fastening technology, can shoot nails, and belongs to the direct consolidation technology. It is a necessary hand-operated tool for carpentry, building construction, and so on. The nail gun itself contains a mechanism that can produce explosive thrust to directly shoot a fastening nail, thereby firmly connecting a substrate and a member that needs to be fixed, such as a door, a window, an insulation board, a soundproof layer, a decoration, a pipeline, a steel member, and a wooden article.

In the prior art, there are a variety of non-human-driven nail gun products, and the most common nail gun driving modes are electric and pneumatic.

A pneumatic nail gun has the advantages of safety, sufficient power, fast speed, and high efficiency. Moreover, the pneumatic nail gun consumes less energy, and has a relatively simple structure and the low manufacturing cost. Therefore, pneumatic nail guns are mostly selected for use in processing environments of factories. However, the pneumatic nail gun has very high requirements for sites, and must be externally connected to a pneumatic source. Moreover, the pneumatic source and a pipeline path are usually determined at the time of site decoration and cannot be changed at will.

Therefore, the working position of the pneumatic nail gun cannot be changed at will. In some solutions, a portable pneumatic source is used, so that the working position of the pneumatic nail gun can be flexibly selected, but the portable pneumatic source cannot support a long enough working time.

An electric nail gun is another common solution. Compared with the pneumatic source, a power source is much simpler to obtain and connect. Therefore, the working position of the electric nail gun is very flexible. In addition, an electric nail gun with a rechargeable battery can be carried for use, and can still be used normally in an application scenario without a power source. This is very convenient. However, the electric nail gun also has certain disadvantages. An electric motor is likely to heat up when it is working, and long-time use will affect the life of the electric motor. Therefore, a single working time should not be too long, and the electric motor needs to rest at regular intervals. Consequently, the work efficiency is reduced. If different electric nail guns are prepared or a nail gun is kept in a working state for a long time to increase the work efficiency, equipment costs will be increased, resulting in the need to prepare a plurality of nail guns or frequently maintain and replace electric motors.

The pneumatic nail gun and the electric nail gun have their own advantages, but also have their own disadvantages. Therefore, users need to select proper tools in different use scenarios. However, cost-conscious users, especially personal users, cannot be equipped with various types of nail guns, so it is difficult to make a choice. If there is a nail gun that can flexibly adapt to various use scenarios without the need to change different types of nail guns for different scenarios, it will become a good choice for users.

Therefore, those skilled in the art devote themselves to developing a hybrid nail gun to solve the technical problems existing in the prior art. This hybrid nail gun can be driven by either a pneumatic source or a power source, and therefore can exploit the advantages of pneumatic and electric nail guns in different application scenarios without the need to pay the cost of two types of nail guns.

SUMMARY OF THE INVENTION

In view of the above disadvantages of the prior art, the technical problem to be solved by the present invention is how to use one nail gun to flexibly adapt to a variety of different application scenarios to exploit the advantages of both pneumatic and electric nail guns.

To solve the above technical problem, the present invention provides a hybrid nail gun, comprising a power component and a drive component, the power component being driven by the drive component, characterized in that the drive component comprises a gas driven device and an electric driven device, the gas driven device comprises a gas source connection port and a pneumatic motor, the electric driven device comprises a power source connection port and an electric motor, and the pneumatic motor and the electric motor are connected in series.

Further, a clutch component is provided between the pneumatic motor and the electric motor, and the clutch component comprises a clutch control member.

Further, the clutch component comprises the clutch control member configured to control the separation and cooperation between the pneumatic motor and a transmission shaft of the electric motor.

Further, the drive component further comprises a reduction box, and an input end of the reduction box is connected to an output shaft of the electric motor, or to an output shaft of the pneumatic motor.

Further, the drive component further comprises an output member provided at an output part of the reduction box, and the output member is brought into contact with the power component and drives the power component to move.

Further, an output part of the gas driven device is connected to an input part of the electric driven device.

Further, an output part of the electric driven device is connected to an input part of the gas driven device.

Further, the output member is a cam.

Further, the power component comprises a fixed shaft, a power spring, and a slider, the power spring is sleeved on the fixed shaft, one end of the power spring is connected to the fixed shaft, and the other end of the power spring is connected to the slider.

Further, the cam is configured to rotate under the drive of the drive component, to drive the slider to slide along the fixed shaft, such that the power spring is in a compressed state.

Further, the slider is provided with a recessed opening configured to enable the cam to be separated from the slider, so as to release the power spring from the compressed state.

Further, the power component comprises a shaft rod, and a plurality of ribs are provided on the shaft rod.

Further, a plurality of cam teeth are provided on the cam, the cam is brought into contact with the ribs via the cam teeth, and the cam is configured to rotate under the drive of the drive component, to drive the shaft rod to move through acting forces of the cam teeth on the ribs.

Further, a toothless part is provided on the cam, and the toothless part is configured such that during the rotation of the cam, the rib loses support from the cam tooth when the toothless part moves to the position of the rib, thereby releasing the shaft rod.

Further, a nail gun housing and a magazine are further comprised, wherein the power part, the drive part, and the magazine are all fixed on the nail gun housing, the magazine comprises a nailing opening, a fastening nail in the magazine is pushed out of the magazine through the nailing opening under an acting force of the slider.

Further, the gas driven device comprises a gas source connection port and a gas cylinder, and the electric driven device comprises a power source connection port and an electric inflation pump.

Further, the gas source connection port is in communication with the gas cylinder, the electric inflation pump is in communication with the gas cylinder, a first one-way valve is provided at a joint part of the gas source connection port and the gas cylinder, and a second one-way valve is provided at a joint part of the electric inflation pump and the gas cylinder.

Further, the first one-way valve is configured such that gas is capable of entering the gas cylinder from the gas source connection port but is not capable of returning to the gas source connection port from the gas cylinder.

Further, the second one-way valve is configured such that gas is capable of entering the gas cylinder from the electric inflation pump but is not capable of returning to the electric inflation pump from the gas cylinder.

Further, the first one-way valve and the second one-way valve have the same structure, comprising a gas valve cavity, a one-way valve spring, and a one-way valve ball; the gas valve cavity is shaped to form cylinders with unequal diameters; a diameter of the gas valve cavity at a non-ventilation end is smaller than a diameter thereof at a ventilation side; the one-way valve spring is provided at the ventilation end of the gas valve cavity; the one-way valve ball is provided at the non-ventilation end of the gas valve cavity; and a diameter of the one-way valve ball is greater than the diameter of the gas valve cavity at the non-ventilation end.

Compared with the prior art, the present invention has at least the following technical effects:

1. A pneumatic source can be used for driving, so that the present invention has low energy consumption, a long working time, and high efficiency in a site with a pneumatic source.
2. A power source can be used for driving, so that the present invention can be used as an electric nail gun in a site without a pneumatic source, thereby breaking through the limitation of the pneumatic source and being able to be carried for use flexibly.
3. In the present invention, an electric inflation pump may be provided, thereby not only avoiding the dependence on the pneumatic source but also breaking through the limitation of the working time of the electric motor.
4. In the present invention, one nail gun is used to flexibly adapt to various application scenarios without the need to pay the cost of two nail guns, so that the cost is low.

The concept, specific structure and resulting technical effects of the present invention are further described below in conjunction with the drawings to fully understand the object, features, and effects of the present invention.

Figure 1:
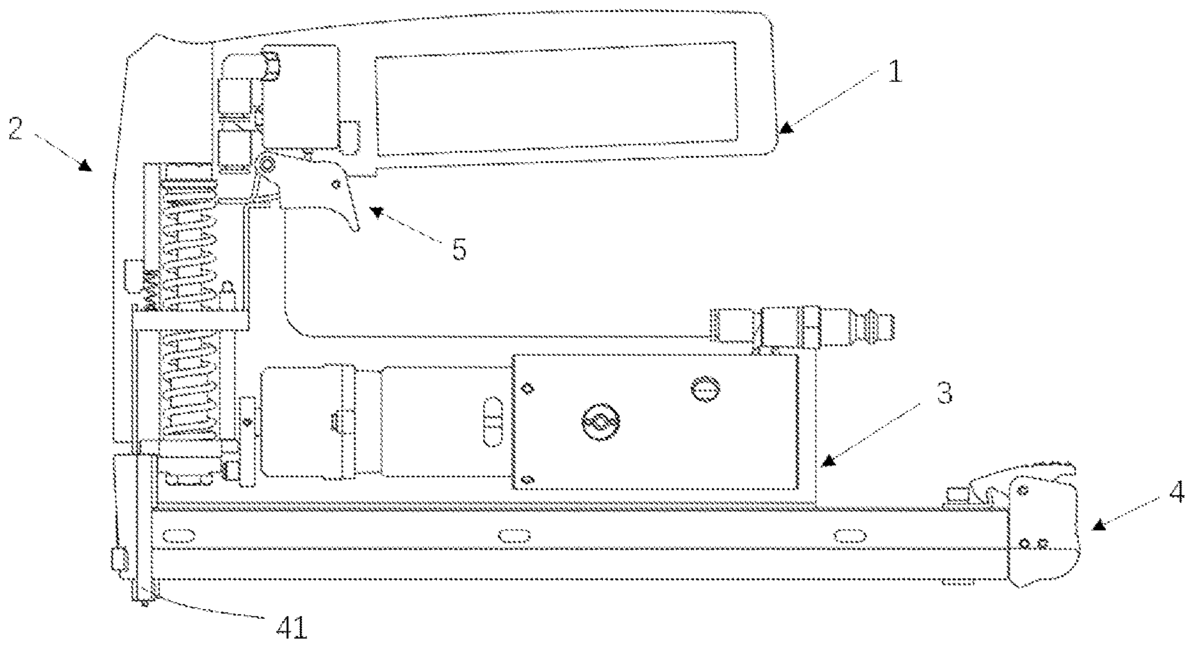
FIG. 1 is a schematic diagram of an overall structure of an embodiment of the present invention.

In the figures, 1—nail gun housing, 2—power component, 21—fixed shaft, 22—power spring, 23—slider, 231—recessed opening, 26—shaft rod, 27—toothed cam, 28—rib, 271—cam tooth, 272—toothless part, 3—drive component, 31—pneumatic motor, 32—electric motor, 33—linkage spring, 34—slot, 35—clutch component, 36—clutch switch, 37—reduction box, 38—cam, 39—fastening pin, 310—gas source connection port, 311—pneumatic motor housing, 312—pneumatic motor bearing, 313—electric inflation pump, 314—inflation pump switch, 315—first one-way valve, 3151—one-way valve spring, 3152—one-way valve ball, 3153—gas valve cavity, 316—second one-way valve, 317—gas cylinder, 4—magazine, 41—nailing opening, 5—control component, 51—button, 52—electric switch, 53—gas valve switch, 531—gas valve switch inlet, 532—gas valve switch outlet, and 54—button return spring.

DETAILED DESCRIPTION OF EMBODIMENTS

Preferred embodiments of the present invention are described below with reference to the drawings of the description to make the technical contents clearer and easier to understand. The present invention can be embodied in various forms of embodiments, and the scope of protection of the present invention is not limited to the embodiments mentioned herein.

In the drawings, the same reference numeral indicates components having the same structure, and similar reference numerals indicate components having similar structures or functions throughout. The size and thickness of each component shown in the figures are shown arbitrarily, and the present invention does not define the size and thickness of each component. In order to make the illustration clearer, the thickness of the component in some places of the figures is appropriately exaggerated.

An "upward" direction mentioned in the present invention specifically indicates a direction opposite to the natural gravity when a magazine 4 of the embodiments is placed at a bottom end of a device and the magazine 4 is placed in a horizontal direction. The "upward" direction may vary with placement angles and postures of a nail gun.

Embodiment 1

As shown in FIG. 1, this embodiment comprises a nail gun housing 1, a power component 2, a drive component 3, a magazine 4, and a control component 5. The power component 2, the drive component 3, the magazine 4, and the control component 5 are all fixedly connected to the nail gun housing 1. The magazine 4 contains fastening nails and comprises a nailing opening 41. The power component 2 exerts, under the drive of the drive component 3, an acting force on a fastening nail located at the nailing opening 41 to push the fastening nail out of the nail gun. The control component 5 is used to control the power component 2 and the drive component 3.

Figure 2:
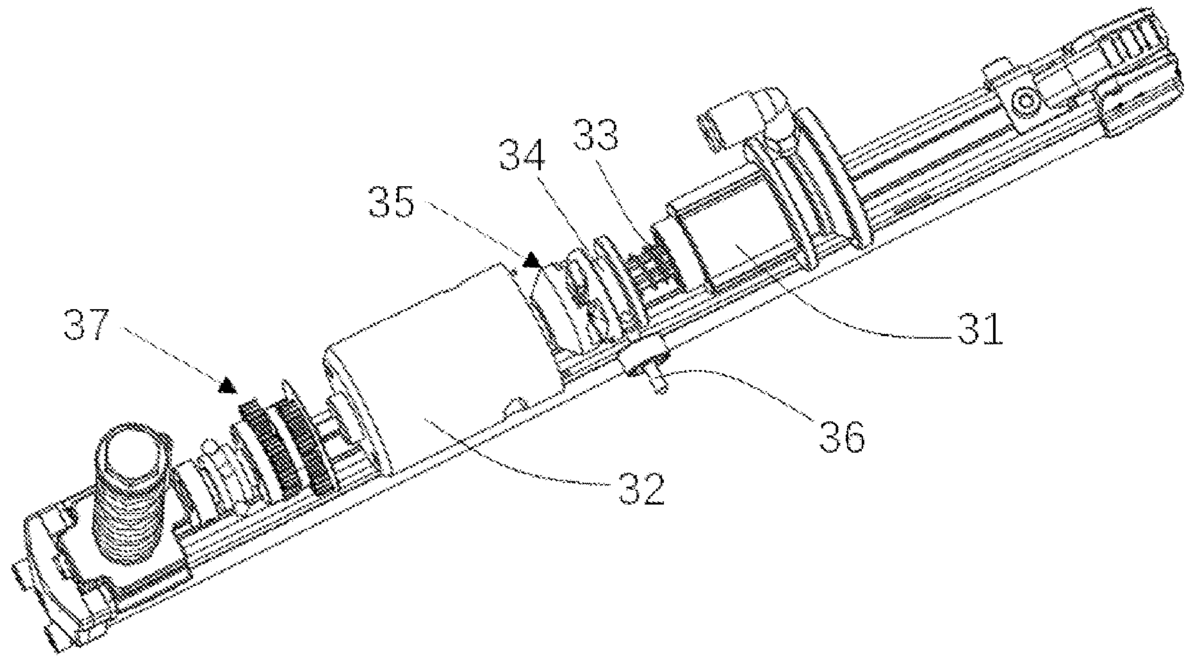
FIG. 2 is a schematic structural diagram of a drive component of an embodiment of the present invention.
Figure 3:
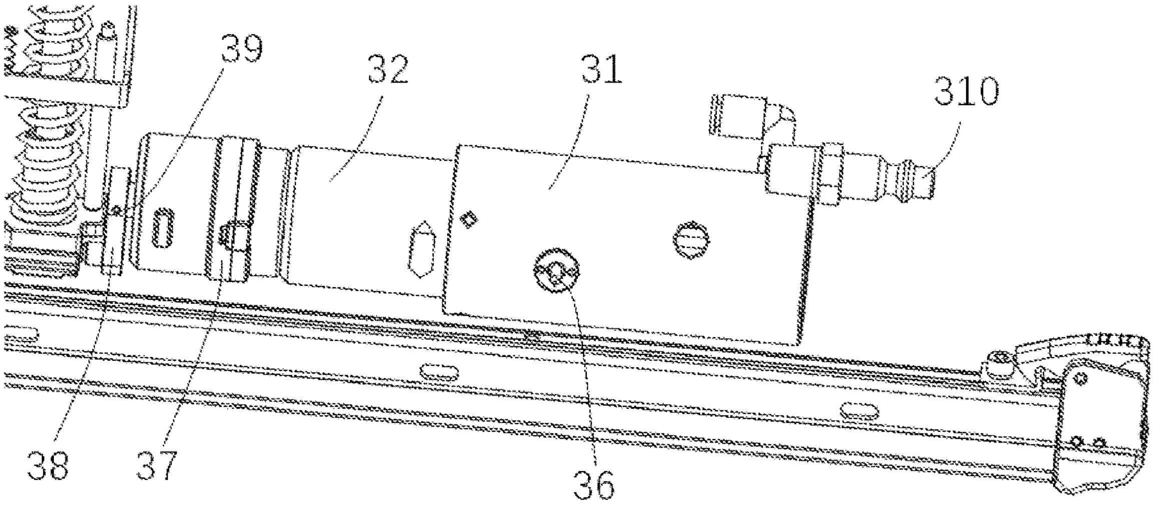
FIG. 3 is a schematic structural diagram of a drive component of an embodiment of the present invention.
Figure 4:
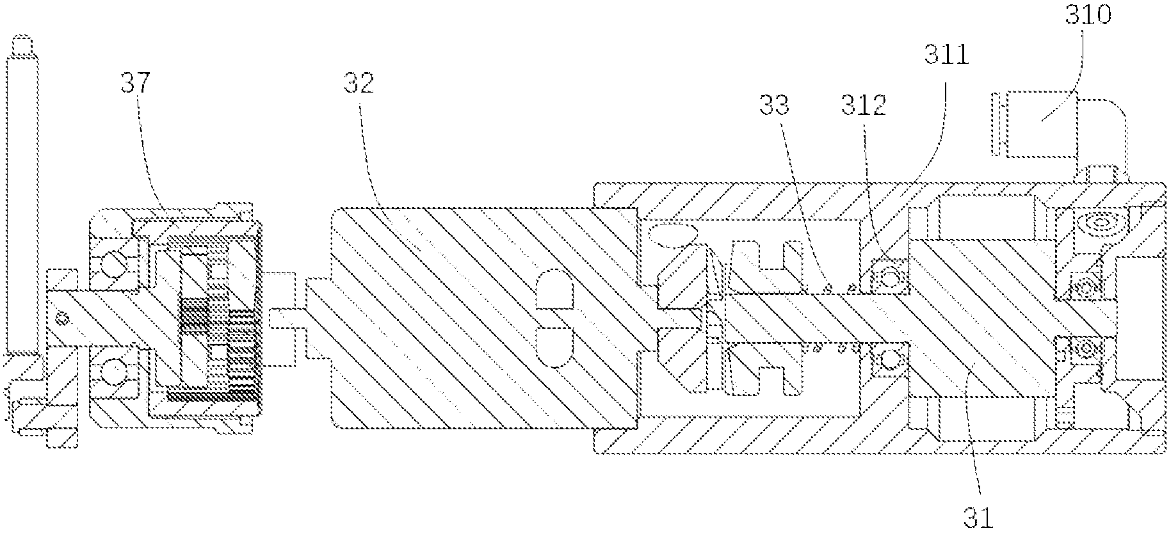
FIG. 4 is a sectional view of a drive component of an embodiment of the present invention.

FIGS. 2 to 4 show schematic structural diagrams of the drive component 3 in this embodiment. A pneumatic motor 31 and an electric motor 32 are comprised. The pneumatic motor 31 comprises a gas source connection port 310 and a pneumatic motor housing 311. An output part of the pneumatic motor 31, namely a pneumatic motor bearing 312, is connected to an input part of the electric motor 32 via a bearing, that is, the pneumatic motor 31 and the electric motor 32 are connected in series. A clutch component 35 is provided between the pneumatic motor 31 and the electric motor 32, and the clutch component 35 is controlled by using a clutch switch 36 such that the pneumatic motor 31 and the electric motor 32 are linked or separated. In this embodiment, the clutch switch 36 is a toggle element, is provided in a slot 34, and has an exposed part on the pneumatic motor housing 311. A separated/linked state is controlled by toggling. A linkage spring 33 is sleeved on the pneumatic motor bearing 312. A reduction box 37 is provided on an output shaft of the electric motor 32 to convert a higher rotation speed of the output shaft of the electric motor 32 into a larger torque to provide power for the power component 2. Preferably, the reduction box 37 comprises a planetary gear.

In this embodiment, in a scenario where there is a gas source, the pneumatic motor 31 provides a driving force to drive the electric motor 32 to rotate under the action of the clutch component 35, thereby outputting power to the reduction box 37. The electric motor 32 generates power when there is no gas source or when it is inconvenient to connect to a gas source. A power source connection port is provided on the nail gun housing 1 to provide energy input for the electric motor 32. In this case, to prevent the pneumatic motor 31 that loses power from causing additional resistance to the electric motor 32, the clutch switch 36 can be toggled, to separate the electric motor 32 from the pneumatic motor 31 by means of the clutch component 35. The electric motor 32 independently outputs power to the reduction box 37. Therefore, this embodiment can be applied to various work scenarios without the need to prepare other types of nail guns.

In this embodiment, the output part of the pneumatic motor 31 is connected to the input part of the electric motor 32 to achieve the effect of having both pneumatic power and electric power. However, in other embodiments, the position of the pneumatic motor 31 and that of the electric motor 32 can be exchanged, that is, an output part of the electric motor 32 is connected to an input part of the pneumatic motor 31, which can also achieve the technical effect of using a gas source or a power source to generate power respectively. It is also possible to provide the clutch component 35 between the pneumatic motor 31 and the electric motor 32 to control a separated/linked state between the two motors.

An output part of the reduction box 37 is provided with a cam 38, and the cam 38 is fixedly connected to an output shaft of the reduction box 37 via a fastening pin 39. In this way, the cam 38 rotates about its axis under the drive of the reduction box 37, and outputs a driving force to the power component 2.

Figure 5:
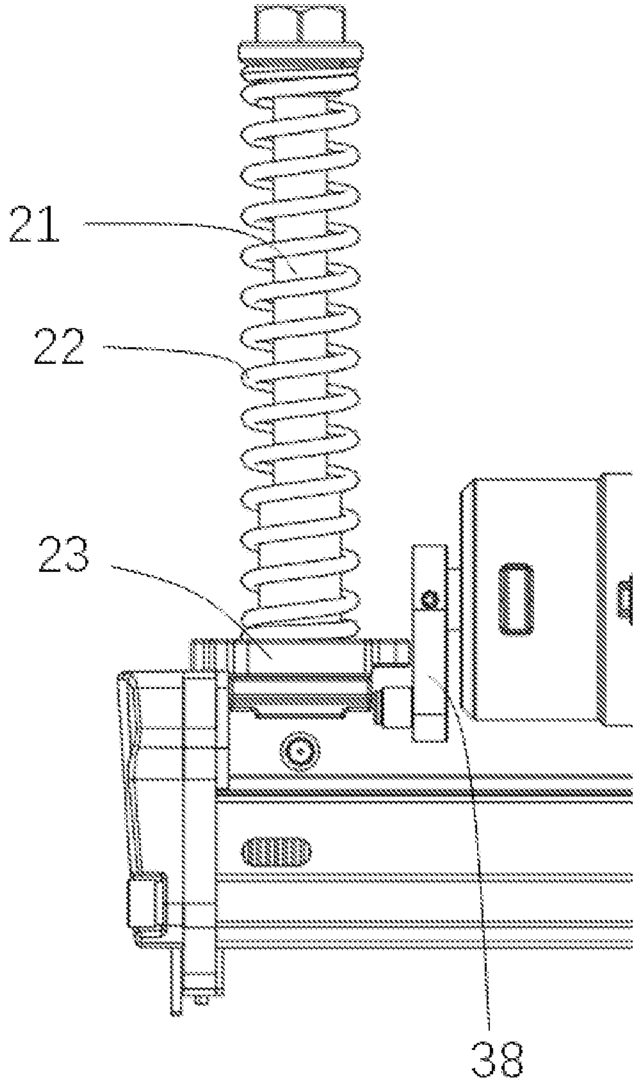
FIG. 5 is a schematic structural diagram of a power component of an embodiment of the present invention.

FIG. 5 shows a schematic structural diagram of the power component 2 of this embodiment. The power component 2 comprises a fixed shaft 21, a power spring 22, and a slider 23. An upper end of the fixed shaft 21 is fixedly connected to the nail gun housing 1. The power spring 22 is sleeved on the fixed shaft 21, an upper end of the power spring is fixedly connected to the fixed shaft 21, and a lower end thereof is fixedly connected to the slider 23.

Figure 6:
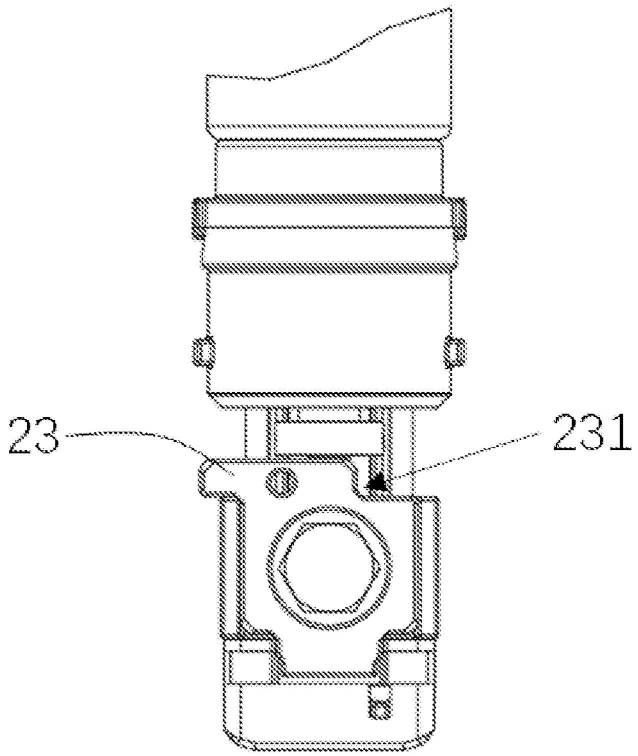
FIG. 6 is a schematic bottom view of a power component of an embodiment of the present invention.

As shown in FIG. 6, the slider 23 is a component with an opening in the middle, and the opening allows the fixed shaft 21 to pass through, such that the slider 23 can slide along the fixed shaft 21. During the rotation of the cam 38, a protrusion provided on the cam 38 is brought into contact with the slider 23 and generates an upward acting force on the slider 23, such that the slider 23 slides upwards along the fixed shaft 21, and the power spring 21 is in a compressed state, thereby storing elastic potential energy. A recessed opening 231 is provided at an edge of the slider 23 on the side close to the drive component 3. When the protrusion on the cam 38 moves to the recessed opening 231, the cam 38 is separated from the slider 23, so the cam 38 no longer generates an acting force on the slider 23. In this case, the compressed power spring 21 releases the previously stored elastic potential energy to drive the slider 23 to slide downwards along the fixed shaft 21. An edge of the slider 23 on the side close to the nailing opening 41 slightly protrudes. When the slider 23 slides to a certain position, its edge is brought into contact with a fastening nail in the magazine 4, and pushes the fastening nail in the magazine 4 out of the magazine 4 through the nailing opening 41 by means of the power provided by the power spring 22. Nailing is completed once. A limiting part may be provided on the nail gun housing 1 to prevent the slider 23 from being separated from the power spring 22 or damaging the magazine 4 due to excessive movement under the action of the power spring 22.

Figure 7:
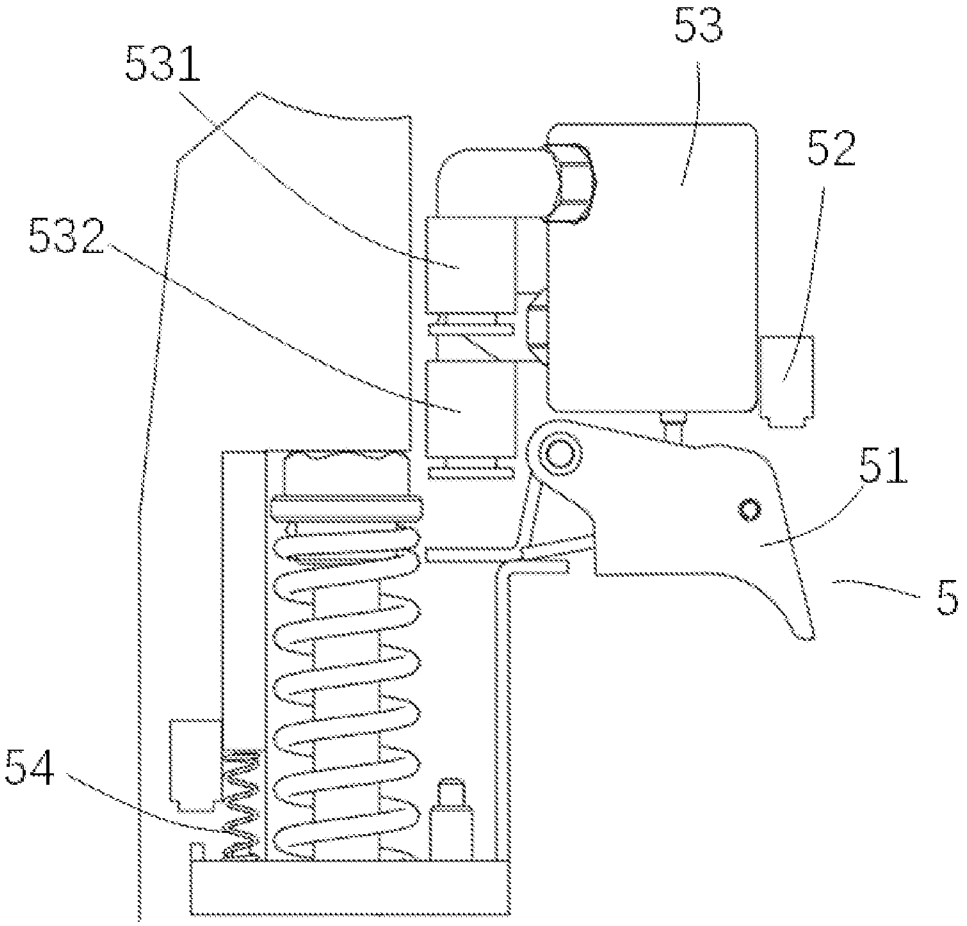
FIG. 7 is a schematic structural diagram of a control component of an embodiment of the present invention.

FIG. 7 shows the control component 5 of this embodiment, comprising a button 51, an electric switch 52, and a gas valve switch 53. The button 51 is a main operating component used by a user for performing a nailing function. The gas valve switch 53 comprises a gas valve switch inlet 531 and a gas valve switch outlet 532. Gas received from the gas source connection port 310 first enters the gas valve switch inlet 531. The gas valve switch 53 comprises an exposed gas valve switch button. When the button 51 is pressed, the gas valve switch button is triggered, and the gas valve switch 53 is turned on. The gas passing through the gas valve switch inlet 531 passes through the gas valve switch outlet 532, and then enters the pneumatic motor 31. When the button 51 is released, the gas valve switch 53 is turned off, so the gas cannot enter the gas valve switch outlet 532 from the gas valve switch inlet 531. In this way, the technical effect of controlling the pneumatic motor 31 is achieved. At the same time, the electric switch 52 is also turned on when the button 51 is pressed, and is turned off when the button 51 is released. Moreover, a state switch of the electric motor 32 is additionally provided. In a scenario where a gas source is connected, there is no need to start the electric motor 32.

Therefore, the state switch of the electric motor 32 can be turned off to ensure that the electric motor 32 is not started when the button 51 is pressed. A button return spring 54 is further provided in this embodiment. The button return spring 54 is connected to the button 51 via a mechanism. When an external force for pressing the button 51 is removed, the button 51 can return to its natural position under the action of the button return spring 54.

Embodiment 2

Figure 8:
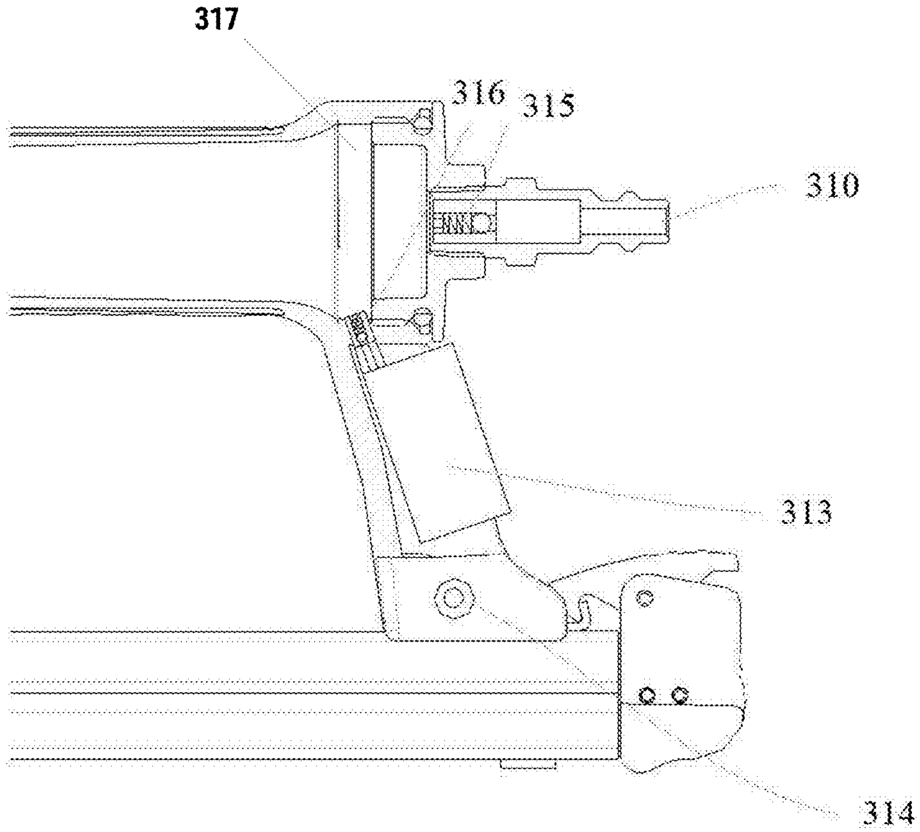
FIG. 8 is a schematic structural diagram of a one-way valve of an embodiment of the present invention.
Figure 9:
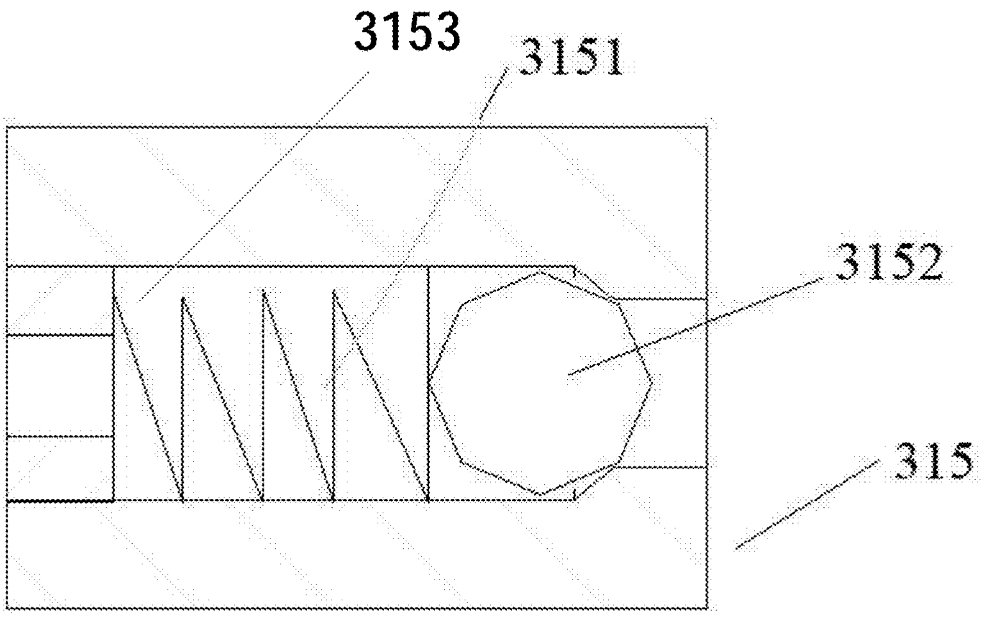
FIG. 9 is a schematic structural diagram of a drive component of an embodiment of the present invention.

FIG. 8 shows a schematic structural diagram of a drive component in another embodiment of the present application. The drive component 3 of this embodiment comprises a gas source connection port 310, and the gas source connection port 310 is in communication with a gas cylinder 317. Gas enters the gas cylinder 317 through the gas source connection port 310. A first one-way valve 315 is provided at a joint part of the gas source connection port 310 and the gas cylinder 317. Due to the action of the first one-way valve 315, gas can only enter the gas cylinder 317 from the gas source connection port 310, but cannot return to the gas source connection port 310 from the gas cylinder 317. In addition, this embodiment further comprises an electric inflation pump 313. The electric inflation pump 313 is in communication with the gas cylinder 317. A second one-way valve 316 is provided at a joint part of the electric inflation pump 313 and the gas cylinder 317. Due to the action of the second one-way valve 316, gas can only enter the gas cylinder 317 from the electric inflation pump 313, but cannot return to the electric inflation pump 313 from the gas cylinder 317. In this embodiment, the first one-way valve 315 and the second one-way valve 316 have the same structure. Taking the first one-way valve 315 as an example, as shown in FIG. 9, a gas valve cavity 3153 of the first one-way valve 315 is generally cylindrical, and its end arranged close to the gas cylinder 317 is referred to as a ventilation end; and the end arranged away from the gas cylinder 317 is referred to as a non-ventilation end. Diameters of the gas valve cavity 3153 are not uniform, and a diameter at the ventilation end is greater than a diameter at the non-ventilation end. A one-way valve spring 3151 and a one-way valve ball 3152 are provided in the gas valve cavity 3153, wherein the one-way valve spring 3151 is provided at the ventilation end of the gas valve cavity 3153, and the one-way valve ball 3152 is provided at the non-ventilation end of the gas valve cavity 3153. A diameter of the one-way valve ball 3152 is greater than the diameter of the gas valve cavity 3153 at the non-ventilation end, so that the one-way valve ball 3152 can block the non-ventilation end of the gas valve cavity 3153 and does not fall out of the non-ventilation end of the gas valve cavity 3153. The diameter of the one-way valve ball 3152 is smaller than the diameter of the gas valve cavity 3153 at the ventilation end, so that the one-way valve ball 3152 can be contained in the gas valve cavity 3153. The one-way valve spring 3151 presses the one-way valve ball 3152 against the non-ventilation end of the gas valve cavity 3153 with a certain elastic force. When gas flows from the non-ventilation end to the ventilation end, as long as the pressure generated by the gas on the one-way valve ball 3152 is greater than the pressure generated by the one-way valve spring 3151, the gas can burst through the one-way valve ball 3152 into the gas valve cavity 3153, and enter the gas cylinder 317 through the gas valve cavity 3153. When gas flows from the ventilation end to the non-ventilation end, the gas and the one-way valve spring 3151 generate pressures in the same direction on the one-way valve ball 3152, so that the one-way valve ball 3152 blocks the non-ventilation end of the gas valve cavity 3153, and therefore the gas cannot leave the gas valve cavity 3153 through the non-ventilation end.

An inflation pump switch 314 is used to control on and off of the electric inflation pump. In this embodiment, the electric inflation pump 313 is used to replace an electric motor part of a conventional electric nail gun. On the one hand, the limitation that the working time of the electric motor should not be too long is broken through. On the other hand, the nail gun can work normally in a work scenario with only a gas source or only a power source, without the need to change different types of nail guns.

Embodiment 3

Figure 10:
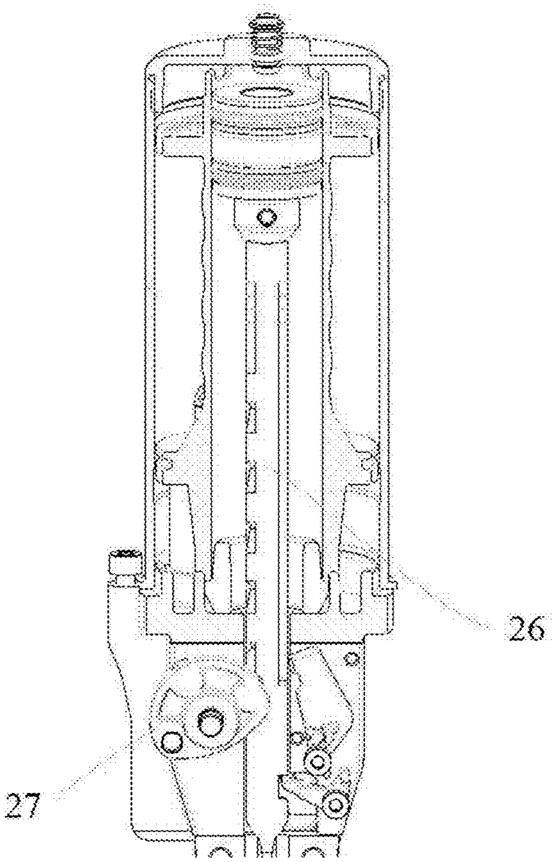
FIG. 10 is a schematic structural diagram of a power component of an embodiment of the present invention.
Figure 11:
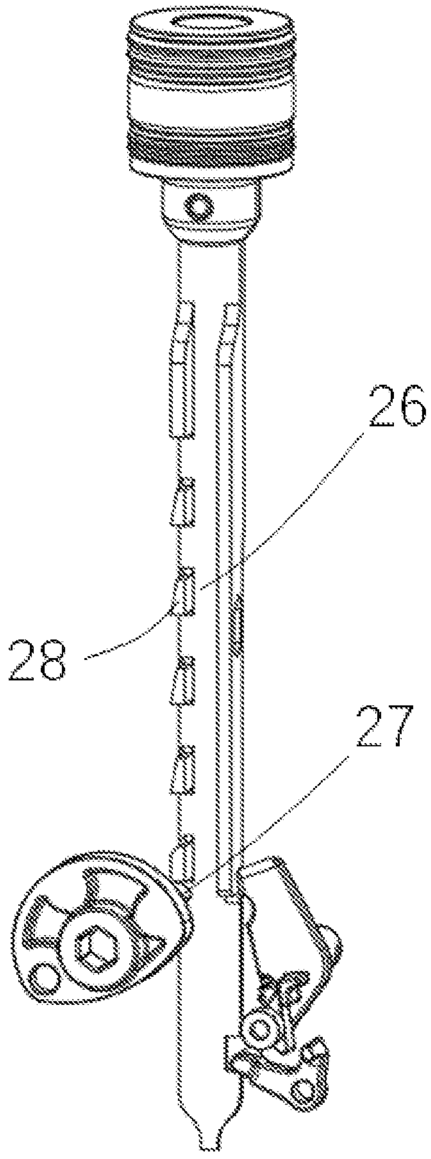
FIG. 11 is a schematic structural diagram of a power component of an embodiment of the present invention.
Figure 12:
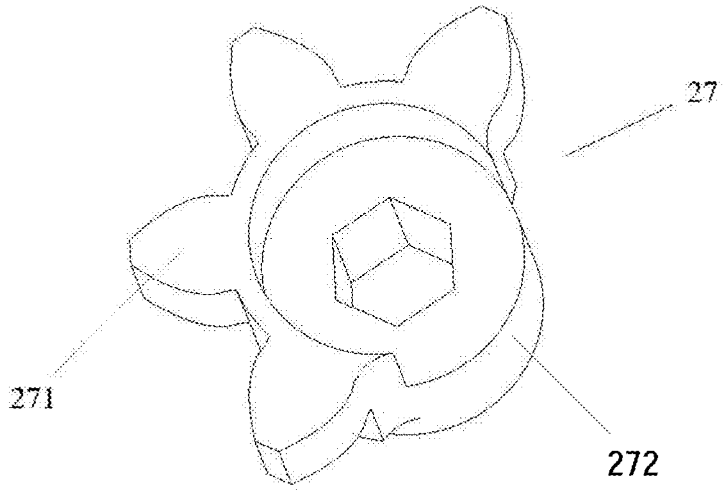
FIG. 12 is a schematic structural diagram of a toothed cam of an embodiment of the present invention.

FIGS. 10 to 12 show schematic structural diagrams of a power component 2 in another embodiment of the present application. In this embodiment, the power component 2 comprises a shaft rod 26, ribs 28 are provided on a surface of the shaft rod 26, and the ribs 28 cooperate with cam teeth 271 on a toothed cam 27. When the toothed cam 27 rotates, the cam tooth 271 exerts an upward acting force to the rib 28, such that the shaft rod 26 moves upwards. The cam teeth 271 are not arranged on the entire circumference of the toothed cam 27, and a toothless part 272 is provided in a partial area thereof. When the toothless part 272 of the toothed cam 27 rotates to the position of the rib 28, the toothed cam 27 is separated from the rib 28, that is, an upward support force on the rib 28 is removed. In this case, the shaft rod 26 moves downwards. The shaft rod 26 can push a fastening nail in a magazine 4 out of the magazine to complete a nailing action. The power component 2 in this embodiment can cooperate with different solutions of the drive component 3 in the above embodiments to form different hybrid nail gun devices.

The specific preferred embodiments of the present invention are described in detail above. It should be understood that a person of ordinary skill in the art would be able to make various modifications and variations according to the concept of the present invention without involving any inventive effort. Therefore, any technical solution that can be obtained by those skilled in the art by means of logical analysis, reasoning or limited trials on the basis of the prior art and according to the concept of the present invention should be included within the scope of protection of the claims.

The invention claimed is:

1. A hybrid nail gun, comprising a power component and a drive component, the power component being driven by the drive component, characterized in that the drive component comprises pneumatic motor and an electric motor, the pneumatic motor comprises a gas source connection port and a pneumatic motor housing, and the pneumatic motor and the electric motor are connected in series;

wherein a clutch component is provided between the pneumatic motor and the electric motor, and the clutch component comprises a clutch switch configured to control separation and cooperation between the pneumatic motor and the electric motor;

wherein the drive component further comprises a reduction box and an output member provided at the reduction box, and the reduction box is connected to the electric motor, or to the pneumatic motor, and the output member is brought into contact with the power component and drives the power component to move;

the pneumatic motor is connected to the electric motor, and the output member is a cam.

2. The hybrid nail gun of claim 1, characterized in that the power component comprises a fixed shaft, a power spring, and a slider, the power spring is sleeved on the fixed shaft, one end of the power spring is connected to the fixed shaft, and the other end of the power spring is connected to the slider.

3. The hybrid nail gun of claim 2, characterized in that the cam is configured to rotate under the drive of the drive component, to drive the slider to slide along the fixed shaft, such that the power spring is in a compressed state.

4. The hybrid nail gun of claim 3, characterized in that the slider is provided with a recessed opening configured to enable the cam to be separated from the slider, so as to release the power spring from the compressed state.

5. The hybrid nail gun of claim 4, characterized by further comprising a nail gun housing and a magazine, wherein the power part, the drive part, and the magazine are all fixed on the nail gun housing; the magazine comprises a nailing opening; and a fastening nail in the magazine is pushed out of the magazine through the nailing opening under an acting force of the slider.

6. The hybrid nail gun of claim 1, characterized in that the power component comprises a shaft rod, and a plurality of ribs are provided on the shaft rod.

7. The hybrid nail gun of claim 6, characterized in that a plurality of cam teeth are provided on the cam, the cam is brought into contact with the ribs via the cam teeth, and the cam is configured to rotate under the drive of the drive component, to drive the shaft rod to move through acting forces of the cam teeth on the ribs.

8. The hybrid nail gun of claim 7, characterized in that a toothless part is provided on the cam, and the toothless part is configured such that during the rotation of the cam, the rib loses support from the cam tooth when the toothless part moves to the position of the rib, thereby releasing the shaft rod.

9. The hybrid nail gun of claim 1, characterized in that the drive component comprises a gas cylinder, and the drive component comprises an electric inflation pump.

10. The hybrid nail gun of claim 9, characterized in that the gas source connection port is in communication with the gas cylinder, the electric inflation pump is in communication with the gas cylinder, a first one-way valve is provided at a joint part of the gas source connection port and the gas cylinder, and a second one-way valve is provided at a joint part of the electric inflation pump and the gas cylinder.

11. The hybrid nail gun of claim 10, characterized in that the first one-way valve is configured such that gas is capable of entering the gas cylinder from the gas source connection port but is not capable of returning to the gas source connection port from the gas cylinder.

12. The hybrid nail gun of claim 10, characterized in that the second one-way valve is configured such that gas is capable of entering the gas cylinder from the electric inflation pump but is not capable of returning to the electric inflation pump from the gas cylinder.

13. The hybrid nail gun of claim 12, characterized in that the first one-way valve and the second one-way valve have the same structure, comprising a gas valve cavity, a one-way valve spring, and a one-way valve ball; the gas valve cavity is shaped to form cylinders with unequal diameters; a diameter of the gas valve cavity at a non-ventilation end is smaller than a diameter thereof at a ventilation side; the one-way valve spring is provided at the ventilation end of the gas valve cavity; the one-way valve ball is provided at the non-ventilation end of the gas valve cavity; and a diameter of the one-way valve ball is greater than a diameter of the gas valve cavity at the non-ventilation end.

* * * * *